(12) United States Patent
Matsushige et al.

(10) Patent No.: US 7,120,736 B2
(45) Date of Patent: Oct. 10, 2006

(54) STORAGE UNIT AND CIRCUIT FOR SHAPING COMMUNICATION SIGNAL

(75) Inventors: Hiromi Matsushige, Hiratsuka (JP); Hiroshi Suzuki, Sagamihara (JP); Masato Ogawa, Chigasaki (JP); Tomokazu Yokoyama, Fujisawa (JP); Yasuhiro Sakakibara, Odawara (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 10/649,687

(22) Filed: Aug. 28, 2003

(65) Prior Publication Data

US 2004/0236906 A1 Nov. 25, 2004

(30) Foreign Application Priority Data

May 22, 2003 (JP) ............................. 2003-145121

(51) Int. Cl.
  *G11B 20/00* (2006.01)
  *G06F 13/12* (2006.01)
(52) U.S. Cl. ...................... 711/112; 369/47.28; 710/58; 711/114; 711/167
(58) Field of Classification Search .................... None
  See application file for complete search history.

(56) References Cited

U.S. PATENT DOCUMENTS

| | | | |
|---|---|---|---|
| 4,949,051 A | 8/1990 | Viola | 331/11 |
| 5,155,638 A | 10/1992 | Aikawa et al. | 360/69 |
| 5,430,855 A | 7/1995 | Walsh et al. | 710/10 |
| 5,512,860 A | 4/1996 | Huscroft et al. | 331/1 A |
| 5,898,828 A | 4/1999 | Pignolet et al. | 714/6 |
| 5,974,058 A | 10/1999 | Burns et al. | 370/538 |
| 6,069,927 A | 5/2000 | Kikuchi | 375/357 |
| 6,266,383 B1 | 7/2001 | Kikuchi | 375/358 |
| 6,392,495 B1 | 5/2002 | Larsson | 331/11 |
| 6,470,007 B1 | 10/2002 | Berman | |
| 6,530,007 B1 | 3/2003 | Olarig et al. | 711/167 |
| 2001/0033407 A1 | 10/2001 | Cao | |
| 2001/0052806 A1 | 12/2001 | Gu et al. | |
| 2002/0002440 A1 | 1/2002 | Sakai | |
| 2002/0004892 A1 | 1/2002 | Gans et al. | |
| 2002/0033714 A1 | 3/2002 | Perrott | |
| 2002/0053010 A1 | 5/2002 | Piccirillo et al. | |
| 2002/0129182 A1 | 9/2002 | Coffey | |
| 2002/0138692 A1 | 9/2002 | Gerhart | |
| 2002/0199051 A1 | 12/2002 | Fukae et al. | |
| 2003/0140207 A1 | 7/2003 | Nagase et al. | |

FOREIGN PATENT DOCUMENTS

| | | |
|---|---|---|
| EP | 0862272 | 9/1998 |
| EP | 0866559 | 9/1998 |
| EP | 1115064 | 7/2001 |
| EP | 1104113 | 9/2002 |
| EP | 1353264 | 10/2003 |
| JP | 2002359661 | 12/2002 |
| WO | 03034647 | 4/2003 |

*Primary Examiner*—Gary Portka
(74) *Attorney, Agent, or Firm*—Mattingly, Stanger, Malur & Brundidge, P.C.

(57) ABSTRACT

The present invention relates to a storage unit comprising: a channel control portion for receiving a data input/output request; a cache memory for storing data; a disk control portion for performing input/output processing on data in accordance with the data input/output request; and a plurality of disk drives for storing data, wherein at least two of the disk drives input data to and output it from the disk control portion at different communication speeds. Further, the storage unit has a plurality of communication paths provided to connect at least one of the disk drives in such a manner as to constitute a loop defined by the FC-AL fiber channel standards, so that the communication speeds can be set differently for these different communication paths.

11 Claims, 14 Drawing Sheets

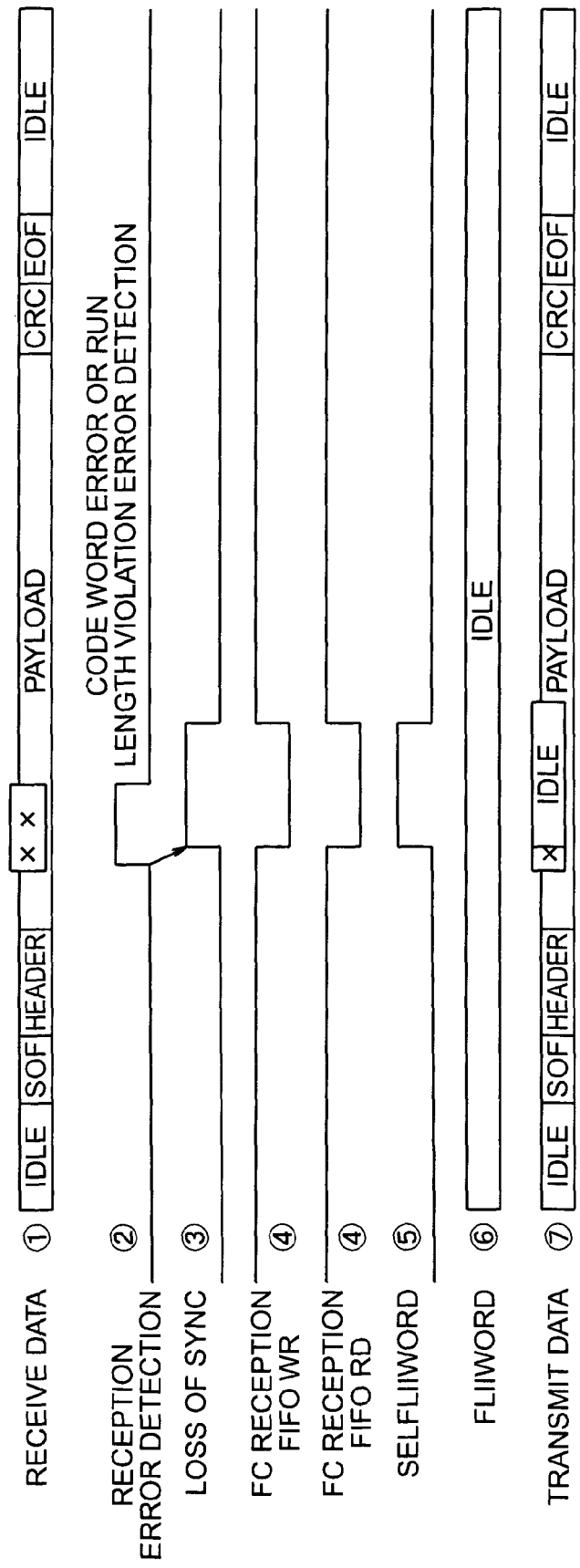

STORAGE UNIT AND CIRCUIT FOR SHAPING COMMUNICATION SIGNAL

CROSS-REFERENCE TO RELATED APPLICATIONS

A Japanese Patent Application No. 2003-145121 upon which the present application is based and which was filed on May 22, 2003 is cited herein as a reference.

BACKGROUND OF THE INVENTION

1. Field of the Invention

The present invention relates to a storage unit and a circuit for shaping a communication signal.

2. Description of the Related Art

With a progress of information technologies in the recent years, a communication speed has increased at which data is input to and output from a disk drive of a storage unit. For example, in the case of data input/output that complies with, for example, the fiber channel standards, communication speeds of 1 Gbps (Giga bits per second) and 2 Gbps are put to practical use in communication presently. Further, technologies for communication at a communication speed of 4 Gbps are under development for practical utilization.

Thus, there are prevailing disk drives having various communication speeds in a market.

By the way, there are some cases where it is desired to use disk drives having different communication speeds in the same storage unit as in the case of, for example, providing an additional disk drive to a storage unit that is in service.

However, a conventional storage unit does not have such a mechanism that disk drives having different communication speeds at which data is input/output are used in a mixed manner and so cannot accommodate needs of a user who wishes to use disk drives having different communication speeds as mixed in the same storage unit.

SUMMARY OF THE INVENTION

In view of the above, the present invention has been developed and, it is an object of the present invention to provide a storage unit and a circuit for shaping a communication signal.

To solve the problems described above, the storage unit related to the present invention comprises:

a channel control portion for receiving a data input/output request;

a cache memory for storing data;

a disk control portion for performing data input/output processing in accordance with the data input/output request; and a plurality of disk drives for storing data, wherein at least two of the plurality of disk drives input data to and output it from the disk control portion at different communication speeds.

In this configuration, the storage unit has a plurality of communication paths required to connect at least one two of the disk drives in such a manner as to constitute a loop defined by the FC-AL fiber channel standards, so that the communication speeds can be set differently for the different communication paths.

The storage unit refers to a memory equipped with a disk drive. Further, the disk drive refers to a device equipped with a recording medium to record data, thus coming in, for example, a hard disk device or a semiconductor memory device.

The fiber channel standards are standardized as open standards by the American National Standards Institute (ANSI). The (Fiber Channel Arbitrated Loop (FC-AL) standards provide for specifications applied to a case where communication paths defined by the fiber channel standards are configured in a loop.

The other problems disclosed by the present application and their solutions will be made apparent by description of preferred embodiments of the present invention and drawings.

According to the present invention, it is possible to automatically recognize communication speeds of disk drives and also provide a storage unit and a communication signal shaping circuit that can accommodate the recognized communication speeds.

Other objects, features and advantages of the invention will become apparent from the following description of the embodiments of the invention taken in conjunction with the accompanying drawings.

BRIEF DESCRIPTION OF THE DRAWINGS

FIG. 14 is a flowchart for showing how an error is detected according to the present embodiment.

DESCRIPTION OF THE EMBODIMENTS

The following will describe embodiments of the present invention in detail with reference to drawings.

=== External Configuration ===

Figure 1:
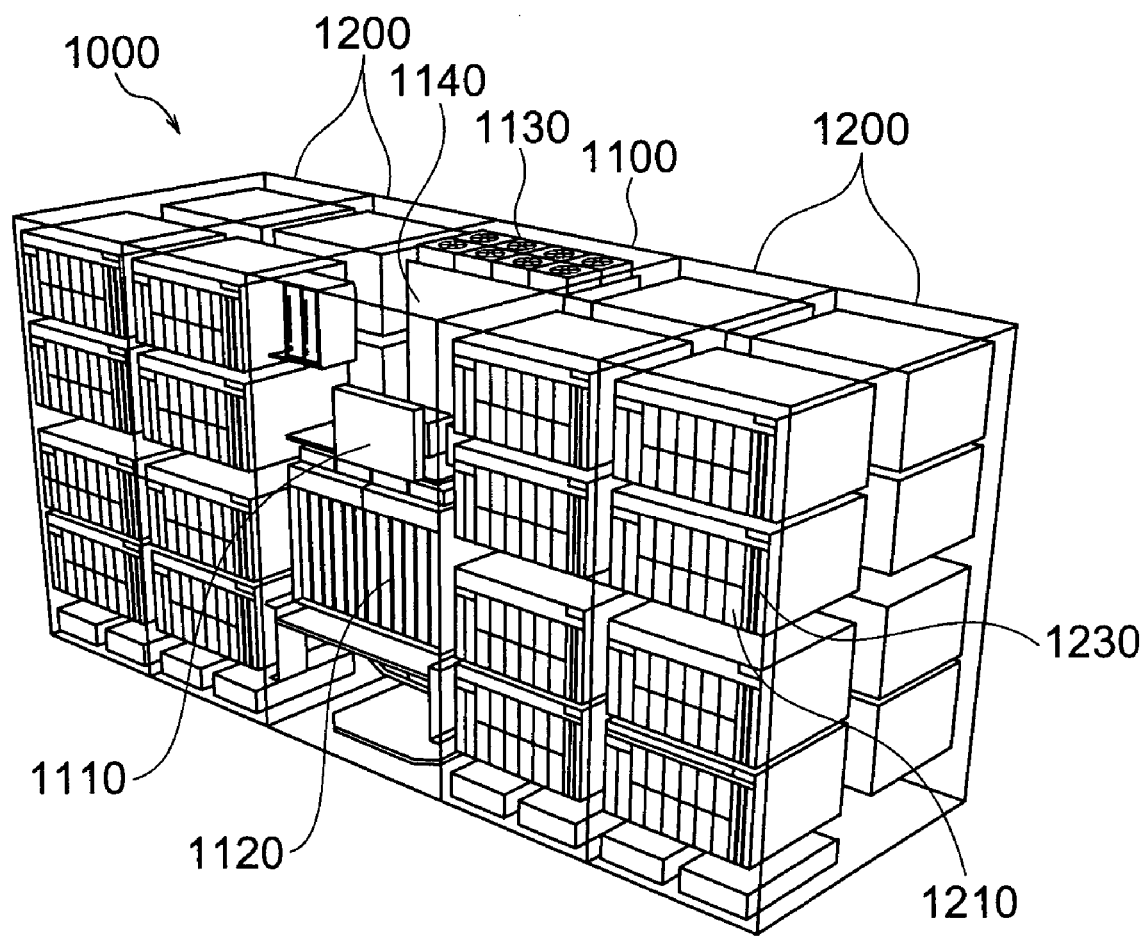
FIG. 1 is an external view for showing an overall configuration of a storage unit related to a first embodiment.

First, an external view of an overall configuration of a storage unit 1000 related to the present embodiment is shown in FIG. 1.

A storage unit 1000 shown in FIG. 1 comprises a disk control device 1100 and disk drive devices 1200 in such a configuration that the disk control device 1100 is arranged at a center and, on its right and left sides, the disk drive devices 1200 are arranged. The disk control device 1100 provides overall control on the storage unit 1000. The disk drive devices 1200 each contain a disk drive 1210. As the disk drive 1210, any of various devices such as a hard disk device or a semiconductor memory device can be employed.

The disk control device 1100 comprises a management terminal 1110, a control circuit portion 1120, a cooling fan 1130, a power supply portion 1140, etc. The management terminal 1110 is arranged at the center of a front face of the disk control device 1100. In FIG. 1, the management terminal 1110 has a form of a notebook type computer and comprises a display and a keyboard that can be folded. By using the management terminal 1110, an operator can maintain and manage the storage unit 1000. The control circuit portion 1120 is mounted with various devices for providing overall control on the storage unit 1000. The devices to be mounted include, for example, a channel adapter (channel control portion) 1121, a disk adapter (disk control portion) 1124, a cache memory 1122, and a shared memory 1123, which are described later. The cooling fan 1130 is used to cool the disk control device 1100. The power supply portion 1140 supplies power necessary to operate the storage unit 1000.

Figure 2:
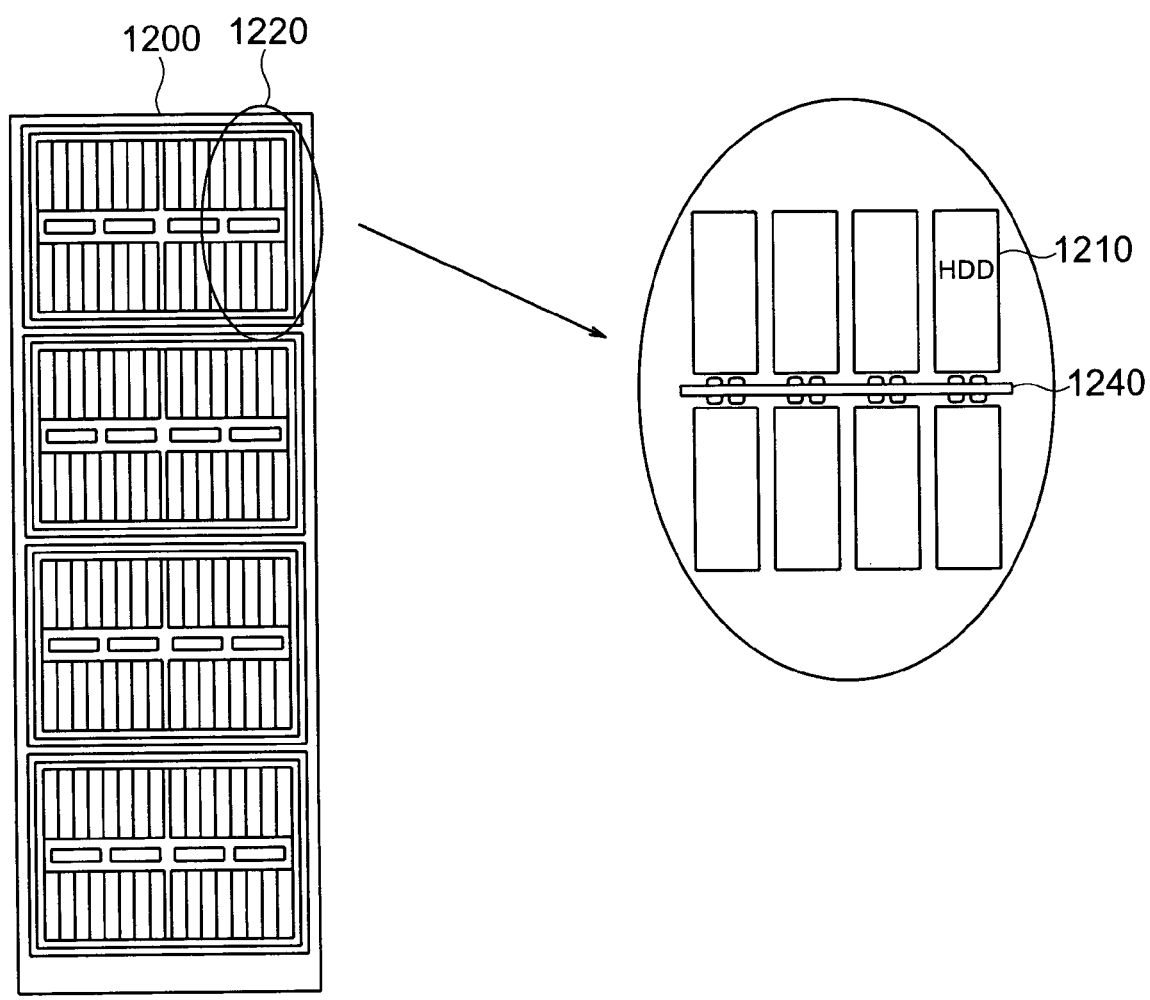
FIG. 2 is an external view for showing a configuration of a disk drive device related to the present embodiment.

The disk drive device 1200 has the disk drives 1210 many arranged therein. The arrangement is shown in FIG. 2. The disk drives (which are shown in a form of an HDD) 1210 are stored detachably in each of frames 1220 of the disk drive device 1200. The disk drive 1210 is stored not only on a front face of the storage unit 1000, that is, on the same side as that of the management terminal 1110 but also on its rear face. Further, a Light-Emitting Diode (LED) display portion 1240 is provided so that an operating condition of each of the disk drives 1210 can be indicated by lighting, blinking, etc. of the LED.

It is to be noted that the configuration and the arrangement of the storage unit 1000 are not limited to those described above. For example, the management terminal 1110 need not be incorporated in the storage unit 1000 and may be a remote computer connected via a communication network. Further, it is not limited in form to a notebook computer and may be in a form of a desktop computer. Further, the disk control device 1100 and the disk drive device 1200 may be integrated with each other in configuration.

Further, the disk drive 1210 may be provided in a form of an SCSI Enclosure Services (SES) drive. The SES drive refers to a disk drive 1210 that has a function to interconnect the disk adapter 1124 and a power supply controller that controls supply of power to the disk drive 1210 so that they can communicate with each other in operation. The SES drive has functions of SCSI Enclosure Services (SES) and Enclosure Service I/F (ESI) that are defined by the Small Computer System Interface 3 (SCSI3) Standards and so can function as an SES or an ESI when predetermined signal pins of a interface connector of the SES drive are connected.

=== Overall Configuration===

Figure 3:
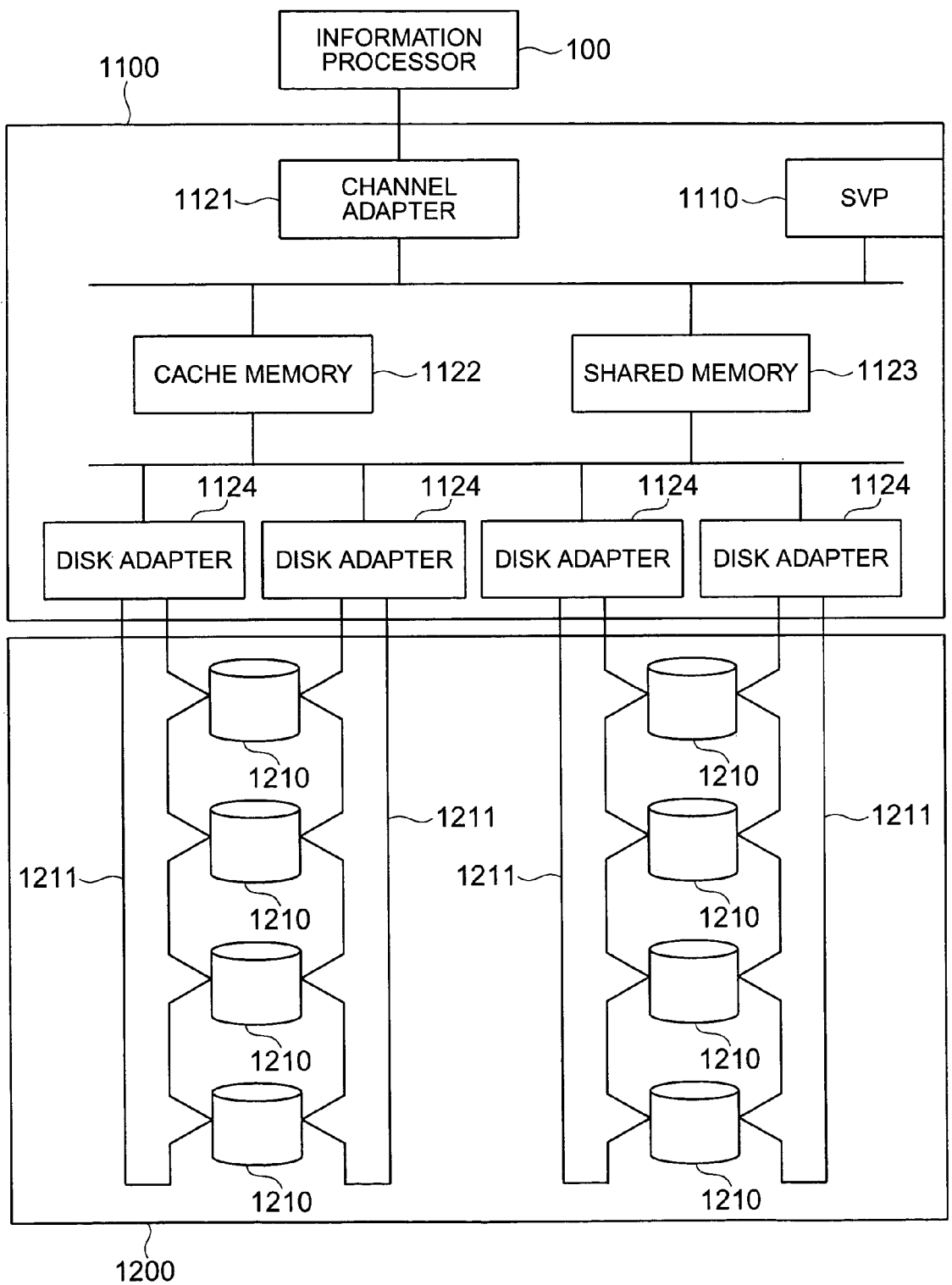
FIG. 3 is a block diagram for showing an overall configuration of the storage unit related to the present embodiment.

Now, a block diagram of an overall configuration of the storage unit 1000 related to the present embodiment is shown in FIG. 3.

The disk control device 1100 receives a data input/output request from an information processor 100, to input data to or output it from the disk drives 1210 of the disk drive device 1200.

The information processor 100 is a computer that is comprised of a Central Processing Unit (CPU) and a memory. The CPU of the information processor 100 executes a variety of programs to implement a variety of functions. The information processor 100 can be utilized as a central computer of, for example, an automatic cash dispenser at a bank or an airplane seat reservation system.

The disk control device 1100 comprises the channel adapter (channel control portion) 1121, the cache memory 1122, the shared memory 1123, the disk adapter (disk control portion) 1124, and the management terminal (which is shown as SVP) 1110.

The channel adapter 1121 is provided with a communication interface with the information processor 100, to give a data input/output request etc. to and receive it from the information processor 100. The channel adapter 1121 can be arranged to give a data input/output request to and receive it from the plurality of information processors 100. In this case, the disk control device 1100 can be provided with the plurality of channel adapters 1121. Further, the channel adapter 1121 and the information processor 100 can be interconnected via a network.

The cache memory 1122 and the shared memory 1123 are provided to store data and commands transferred between the channel adapter 1121 and the disk adapter 1124. For example, if a data input/output request received by the channel adapter 1121 from the information processor 100 is a write-in request, the channel adapter 1121 writes the write-in request into the shared memory 1123 and also writes write-in data received from the information processor 100 into the cache memory 1122. Then, the disk adapter 1124 reads out the write-in data from the cache memory 1122 in accordance with the write-in request written into the shared memory 1123 and writes the data into the disk drive 1210.

The disk adapter 1124 communicates with the disk drive 1210 to thereby input data to and output it from the disk drive 1210. The data is input/output via a communication path 1211 that constitutes a loop (hereinafter referred to also as FC-AL loop) defined by the FC-AL fiber channel standards as shown in FIG. 3. A communication speed employed is 1 Gbps or 2 Gbps defined by the fiber channel standards. Any other communication speeds may be employed.

It is to be noted that the channel adapter 1121, the disk adapter 1124, the cache memory 1122, and the shared memory 1123 need not be provided separately from each other as in the present embodiment and, for example, may be integrated with each other in configuration. Further, at least some of them may be combined and integrally configured.

Further, the channel adapter 1121, the disk adapter 1124, the cache memory 1122, and the shared memory 1123 can be connected through a bus as shown in FIG. 3 or by a switch. Further, they can be connected via a network. In this case, the network employed may be a Local Area Network (LAN).

Figure 4:
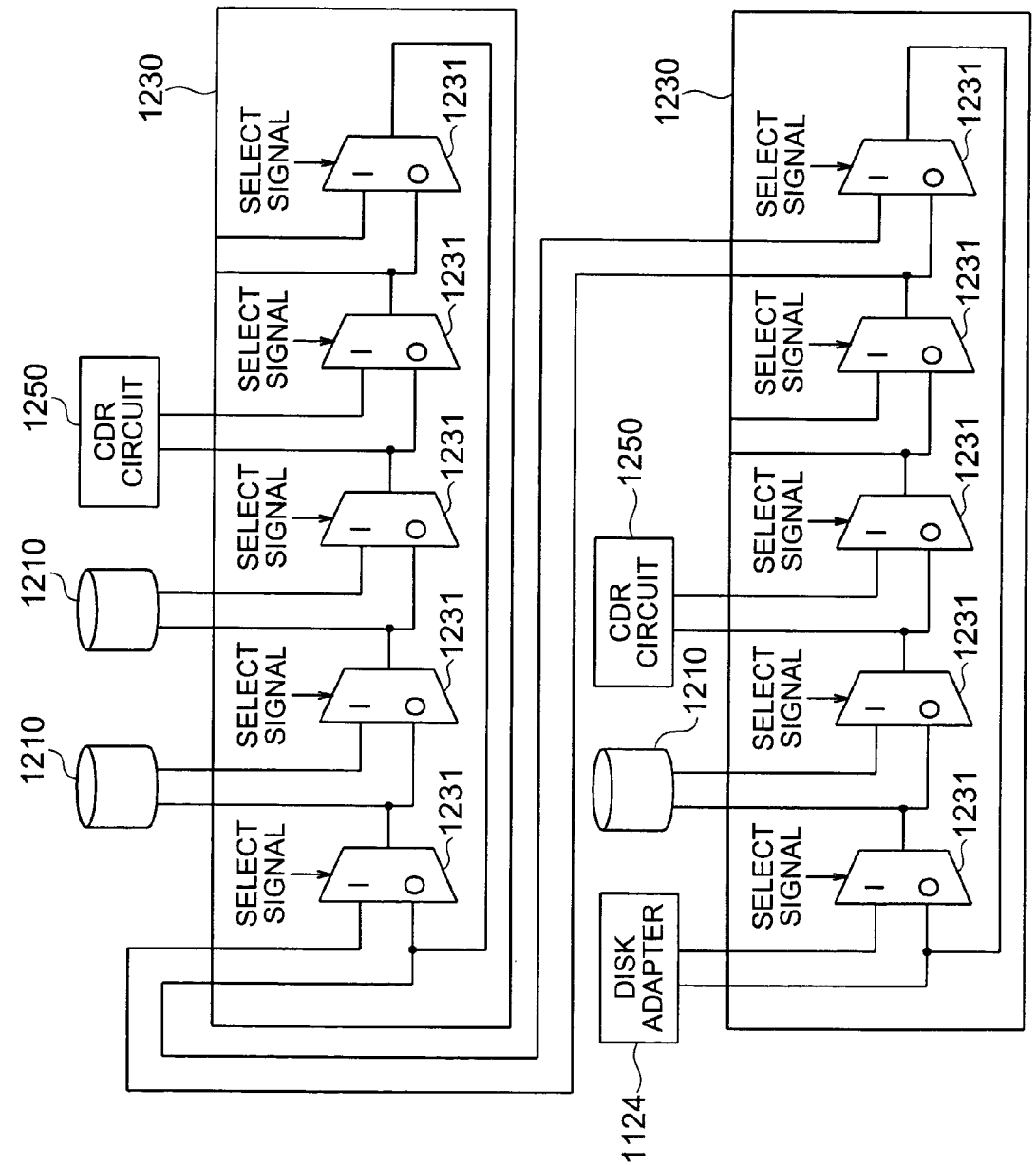
FIG. 4 is a block diagram for showing how a CDR circuit related to the present embodiment is inserted into a FC-AL loop related to the present embodiment.

Now, how the disk adapter 1124 is connected with the disk drive 1210 through the communication path 1211 that constitutes the FC-AL loop is shown in FIG. 4.

As shown in FIG. 4, the FC-AL loop can be constituted by connecting the disk adapter 1124, the disk drive 1210, and a Clock Data Recovery (CDR) circuit 1250 to the respective multiplexers 1231 included in a Port Bypass Circuit (PBC) circuit 1230. The CDR circuit 1250 is provided to suppress turbulence, for example, a jitter in data transferred through the communication path 1211. An example shown in FIG. 4 shows how one FC-AL loop is constituted over the two PBC circuits 1230.

A SELECT signal is provided to each of the multiplexers 1231 to select either an input indicated by "1" or that indicated by "0" of the multiplexer 1231. If the disk adapter

1124, the disk drive 1210, the CDR circuit 1250, etc. are connected to the respective multiplexers 1231, the SELECT signal is input to each of the multiplexers so that their inputs indicated by "1" may be selected. If they are not connected to the multiplexers 1231, the SELECT signal is input to each of the multiplexers so that their inputs indicated by "0" may be selected. Further, if a failure is detected on, for example, one of the disk drives 1210, the SELECT signal is input so that the input, indicated by "0", of the multiplexer 1231 to which this disk drive 1210 is connected may be selected. The SELECT signal can be input to the multiplexers 1231 by the disk adapter 1124, the disk drive 1210, and the CDR circuit 1250 connected to them respectively or solely by, for example, the disk adapter 1124.

It is to be noted that the number of the multiplexers 1231 provided to the PBC circuit 1230 is not limited to such a numeral as given in FIG. 4. For example, in the case of the disk drive device 1200 shown in FIG. 2, to provide one PBC circuit 1230 for each 16 disk drives 1210 arrayed in a row horizontally, at least 17 multiplexers 1231 must be provided to each PBC circuit 1230 so that the FC-AL loop can be constituted by interconnecting one disk adapter 1124 and up to 16 disk drives 1210. In addition to them, there may be provided a multiplexer 1231 for constituting the FC-AL loop over the other PBC circuits 1230 or another multiplexer 1231 for mounting the CDR circuit 1250.

It is to be noted that the CDR circuit 1250 can also be integrated with the PBC circuit 1230 with each other in configuration. For example, in the PBC circuit 1230 shown in FIG. 4, the CDR circuit 1250 can be formed together with each of the rightmost and leftmost multiplexers 1231 on a board on which the PBC circuit 1230 is formed.

=== CDR Circuit===

Figure 5:
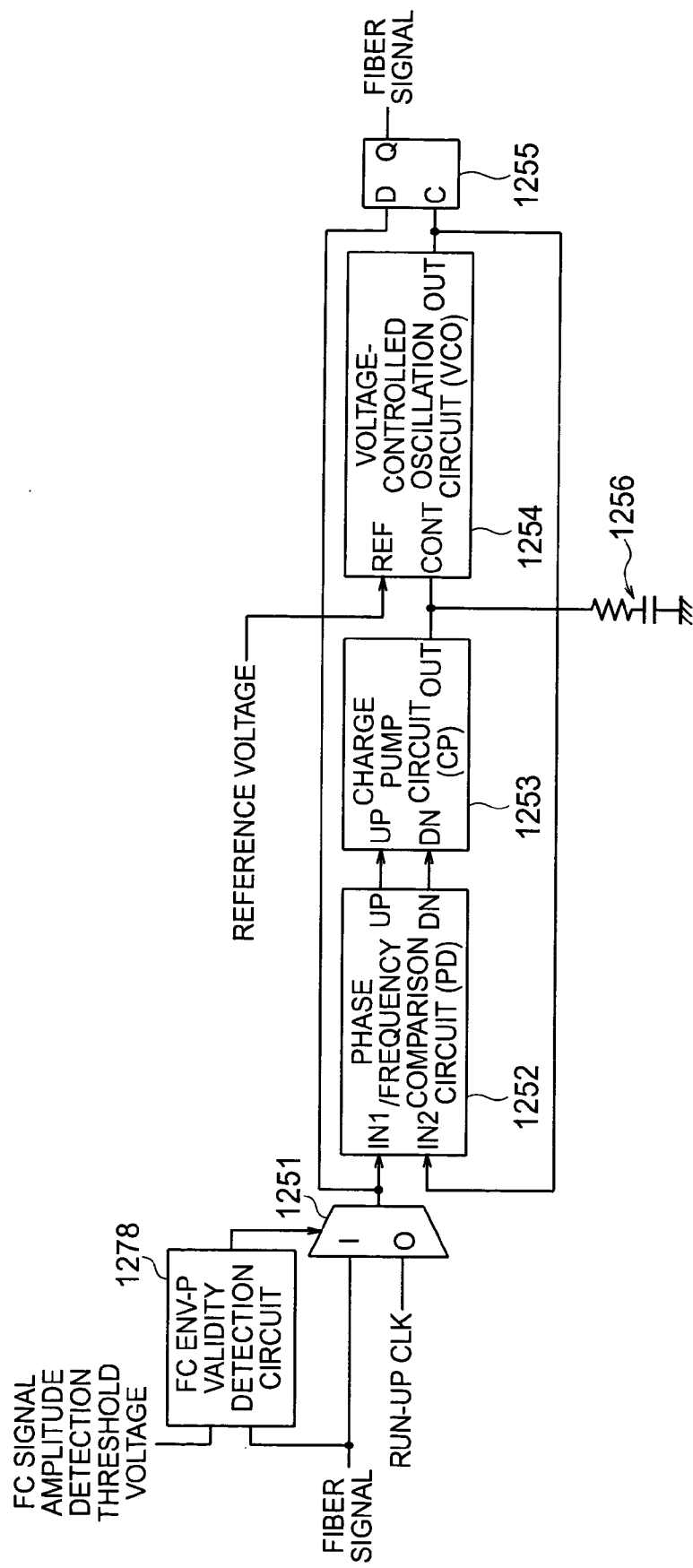
FIG. 5 is a block diagram for showing the CDR circuit.

The CDR circuit 1250 is provided to shape a pulse signal transferred through the communication path 1211 that constitutes the FC-AL loop. A block diagram of the CDR circuit 1250 is shown in FIG. 5.

The CDR circuit 1250 comprises an FC ENV-P validity detection circuit 1278, a multiplexer 1251, a phase/frequency comparison circuit 1252, a charge pump circuit 1253, a voltage-controlled oscillation circuit 1254, a flip-flop 1255, and a filter circuit 1256. It is to be noted that, in FIG. 5, a signal indicated as "Fiber signal" corresponds to the pulse signal transferred via the communication path 1211 that constitutes the FC-AL loop described above. The others are the same as those described above. Further, a circuit constituted of the phase/frequency comparison circuit 1252, the charge pump circuit 1253, the voltage-controlled oscillation circuit 1254, and the filter circuit 1256 corresponds to a generation portion for generating a clock signal from the pulse signal transferred for communication.

The FC ENV-P validity detection circuit 1278 compares a voltage (signal level) of the Fiber signal to an FC signal amplitude detection threshold voltage and, if the Fiber signal is not less than the FC signal amplitude detection threshold voltage, outputs to the multiplexer 1251 a signal that causes its "1" side input signal to be selected. The FC signal amplitude detection threshold voltage is set as a threshold value for detecting that the Fiber signal is input to the CDR circuit 1250. Then, it is possible to detect that the Fiber signal is input to the CDR circuit 1250.

A run-up CLK refers to a clock signal generated by an oscillation circuit such as a crystal oscillation circuit. If the Fiber signal is not input to the CDR circuit 1250, the "0" side input signal of the multiplexer 1251 is selected, to permit the run-up CLK to be input to the CDR circuit 1250.

The phase/frequency comparison circuit 1252 detects a leading edge or a trailing edge of two pulse signals input from IN1 and IN2 terminals respectively, to compare phases of these pulse signals, thus outputting a signal from an UP terminal or a DN terminal in accordance with a phase difference obtained by the comparison.

The charge pump circuit 1253 controls a signal to be output from an OUT terminal in accordance with a signal input from an UP terminal or a DN terminal. For example, if the phase of the pulse signal input from the IN2 terminal is ahead in timing of that of the pulse signal input from the IN1 terminal of the phase/frequency comparison circuit IN2, a voltage of the signal to be output from the OUT terminal of the charge pump circuit 1253 is lowered. In contrast, if the phase of the pulse signal input from the IN2 terminal is behind that of the pulse signal input from the IN1 terminal of the phase/frequency comparison circuit, the voltage of the signal to be output from the OUT terminal of the charge pump circuit 1253 is raised.

The filter circuit 1256 functions as a low-pass filter for the signal output from the OUT terminal of the charge pump circuit 1253.

The voltage-controlled oscillation circuit 1254 outputs from an OUT terminal a clock signal having a frequency that corresponds to a reference voltage input from a REF terminal and that of a signal input from a CONT terminal. If the voltage of the signal input from the CONT terminal is raised with respect to the clock signal output from the OUT terminal at a frequency that corresponds to the reference voltage, the frequency of the clock signal is raised. If the voltage of the signal input from the CONT terminal is lowered with respect to the clock signal output from the OUT terminal at a frequency that corresponds to the reference voltage, on the other hand, the frequency of the clock signal is lowered.

The clock signal thus generated is input to the IN2 terminal of the phase/frequency comparison circuit 1252. It is thus possible to adjust the leading or trailing edge of the clock signal output from the voltage-controlled oscillation circuit 1254 and that of the pulse signal input from the IN1 terminal of the phase/frequency comparison circuit 1252 in such a manner that they may agree in phase.

The flip-flop circuit 1255 is provided to output the pulse signal input from the IN1 terminal of the phase/frequency comparison circuit 1252 in a condition where the pulse signal is synchronized with the clock signal output from the voltage-controlled oscillation circuit 1254.

As described above, by mounting the CDR circuit 1250 to the communication path 1211 that constitutes the FC-AL loop, it is possible to suppress turbulence, for example, a jitter in the pulse signal when it is transmitted or received.

However, in the CDR circuit 1250, if a frequency of the pulse signal is an integral multiple of that of the clock signal or vice versa, no phase difference is detected by the phase/frequency comparison circuit 1252. To prevent this, it is necessary to set a value of the reference voltage so that the clock signal having a frequency close to that of the pulse signal may be output from the voltage-controlled oscillation circuit 1254. This job of setting has been performed by an operator etc. in charge of management of the storage unit 1000.

Figure 6:
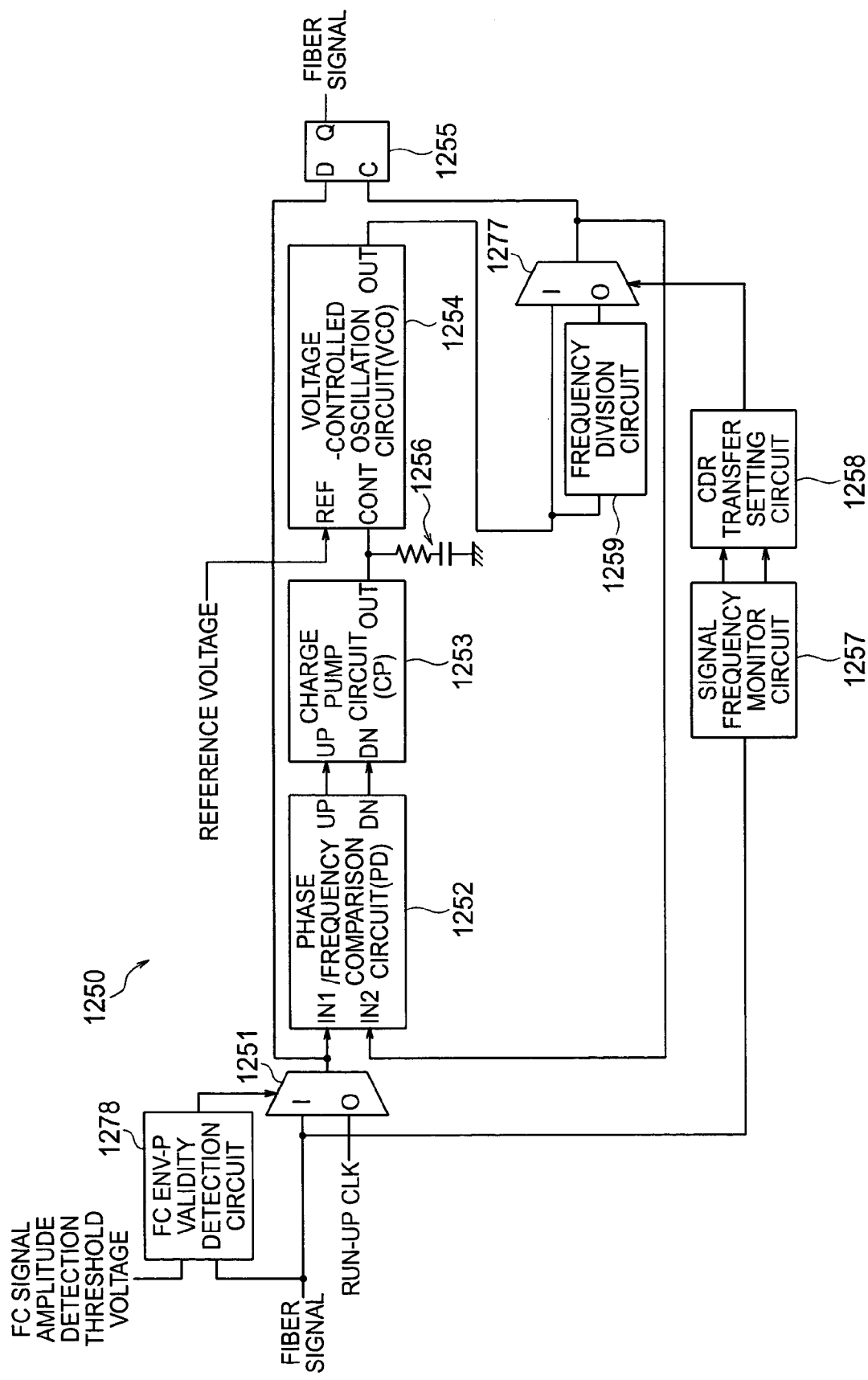
FIG. 6 is a block diagram for showing the CDR circuit related to the present embodiment.

Now, a block diagram for showing the CDR circuit 1250 according to the first embodiment is shown in FIG. 6.

As shown in FIG. 6, the CDR circuit 1250 related to the present embodiment comprises the FC ENV-P validity detection circuit 1278, the multiplexer 1251, the phase/frequency comparison circuit 1252, the charge pump circuit 1253, the voltage-controlled oscillation circuit 1254, the flip-flop (synchronization portion for synchronizing the pulse signal with the clock signal having a divided frequency) 1255, and the filter circuit 1256 and, in addition, a signal period monitor circuit (identification portion for identifying the frequency of the pulse signal) 1257, a CDR transfer setting circuit (identification portion for identifying the frequency of the pulse signal) 1258, a frequency division circuit (frequency division portion for dividing the frequency of the clock signal at a frequency-division ratio that corresponds to the frequency of the pulse signal) 1259, and a multiplexer 1277.

See the description made with reference to FIG. 5 for the FC ENV-P validity detection circuit 1278, the multiplexer 1251, the phase/frequency comparison circuit 1252, the charge pump circuit 1253,the voltage-controlled oscillation circuit 1254, the flip-flop 1255, and the filter circuit 1256.

Figure 7:
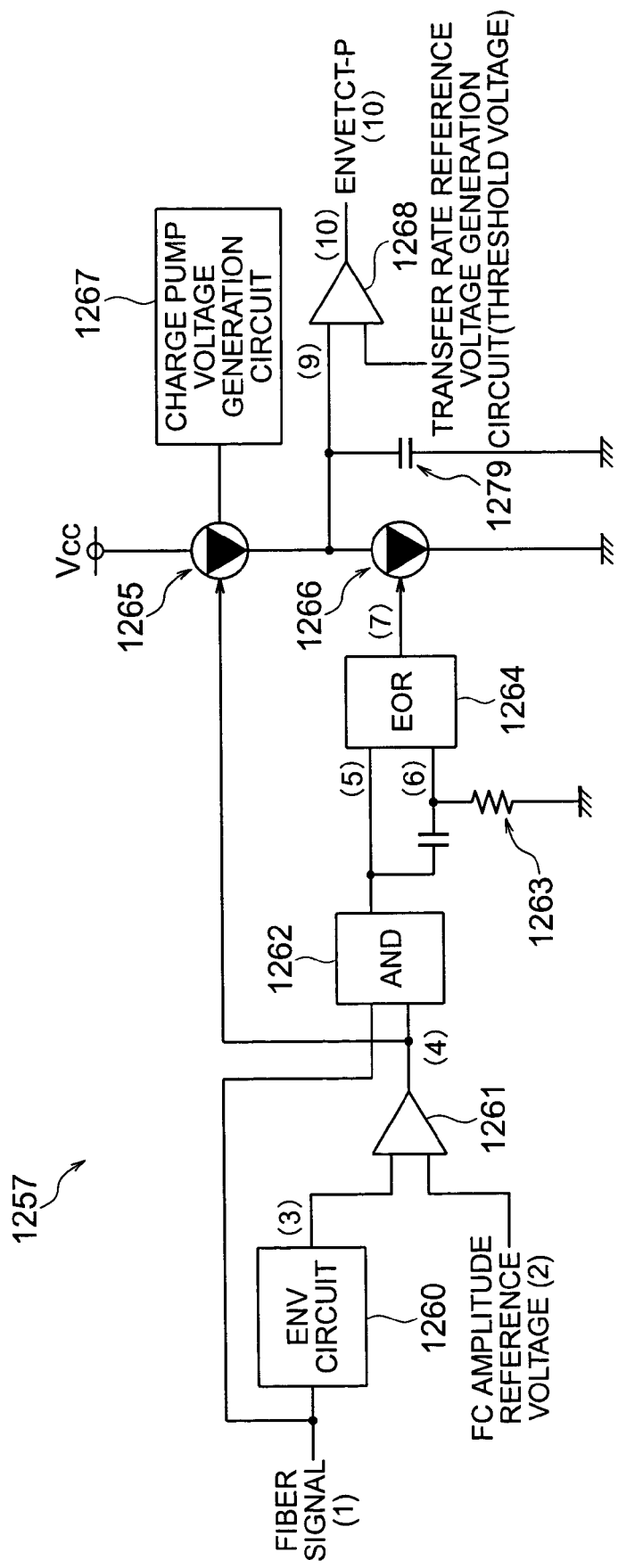
FIG. 7 is a block diagram for showing a signal period monitor circuit related to the present embodiment.
Figure 8:
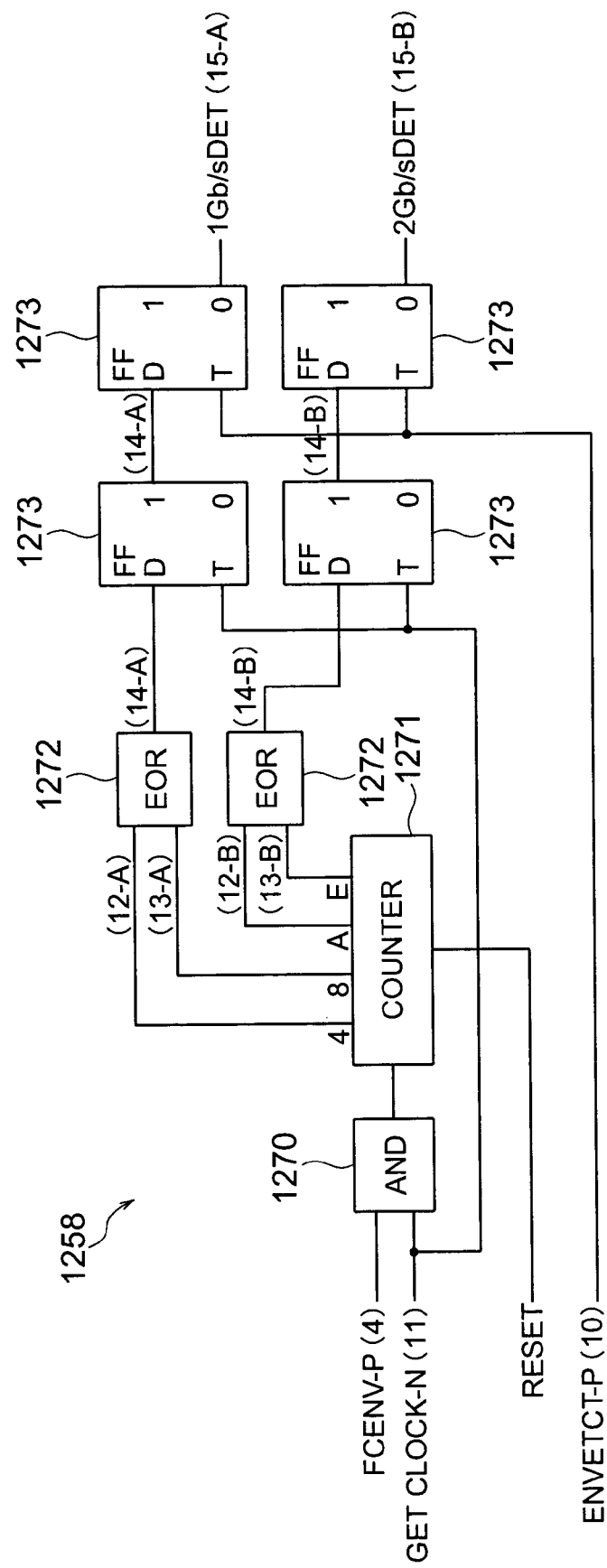
FIG. 8 is a block diagram for showing a CDR transfer setting circuit related to the present embodiment.
Figure 9:
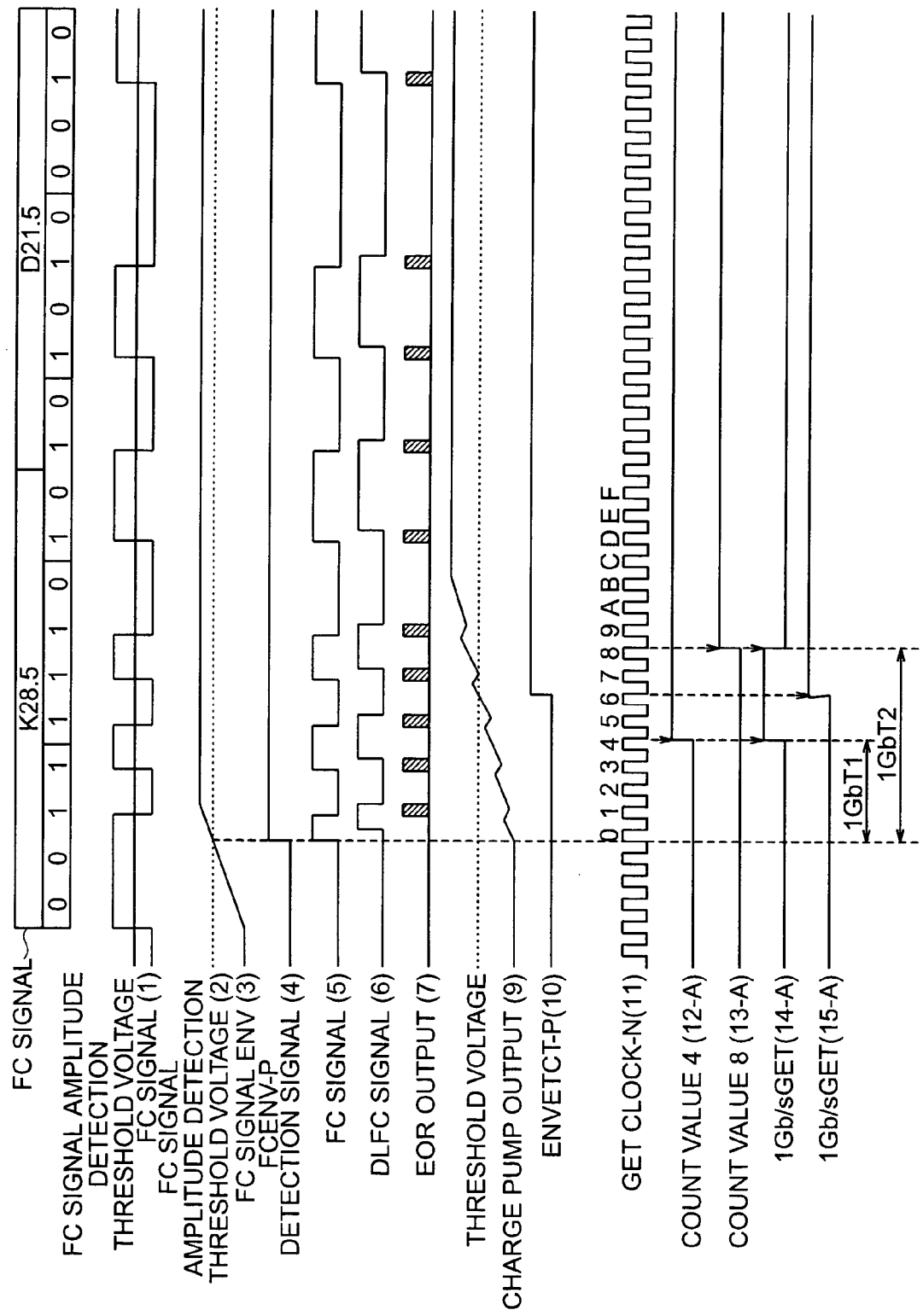
FIG. 9 is a time chart for showing how a frequency of a pulse signal having a communication speed of 1 Gbps is identified by the signal period monitor circuit related to the present embodiment.
Figure 10:
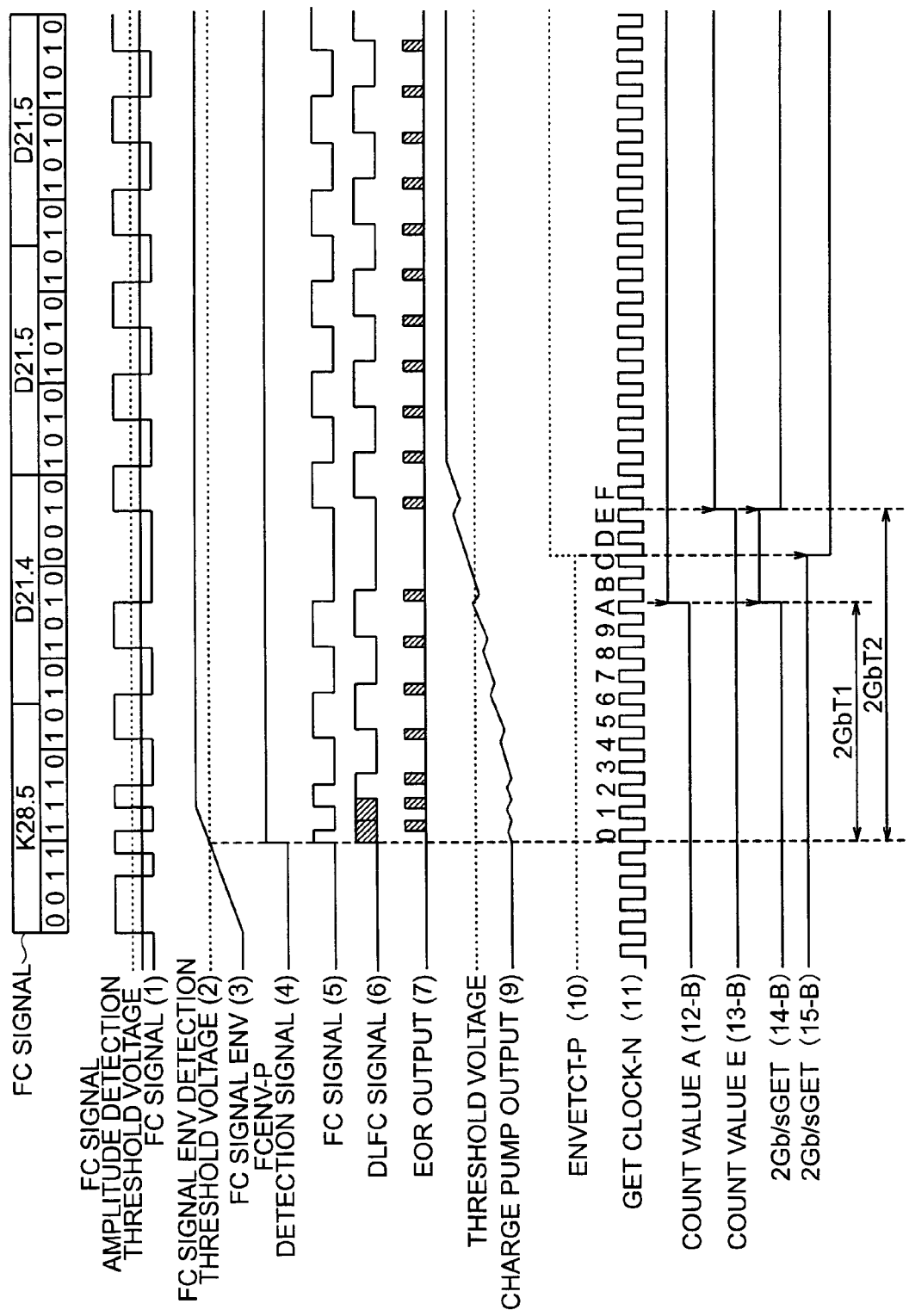
FIG. 10 is a time chart for showing how the frequency of the pulse signal having a communication speed of 2 Gbps is identified by the signal period monitor circuit related to the present embodiment.

The signal period monitor circuit 1257 and the CDR transfer setting circuit 1258, in combination, output a signal used to divide the frequency of the clock signal, in accordance with the frequency of the pulse signal. A block diagram for showing the signal period monitor circuit 1257 is shown in FIG. 7. A block diagram for showing the CDR transfer setting circuit 1258 is shown in FIG. 8. Further, time charts for showing how the signal used to divide the frequency of the clock signal is output are shown in FIGS. 9 and 10. FIG. 9 shows a case where a communication speed of the Fiber signal is 1 Gbps and FIG. 10, a case where the communication speed of the Fiber signal is 2 Gbps. It is to be noted that parenthesized numerals given in the block diagrams of FIGS. 7 and 8 correspond to those attached to various signals shown in the time charts of FIGS. 9 and 10.

The signal/frequency monitor circuit 1257 comprises an ENV circuit 1260, a comparator 1261, an AND circuit 1262, a delay circuit 1263, an EOR (Exclusive OR) circuit 1264, current sources 1265 and 1266, a capacitor 1279, a charge pump voltage generation circuit 1267, and a comparator 1268.

It is to be noted that the capacitor 1279 corresponds to a charge accumulation portion for outputting a voltage that corresponds to a quantity of charge accumulated. The current source 1265 and the charge pump voltage generation circuit 1267 correspond, in combination, to a charge quantity variation portion for varying the quantity of charge accumulated in the charge accumulation portion, at a certain rate of variation. The delay circuit 1263, the EOR circuit 1264, and the current source 1266 correspond, in combination, to a charge quantity variation suppression portion for inhibiting variation only during a certain lapse of time each time a signal level of the pulse signal is switched. Of these, the delay circuit 1263 corresponds also to a pulse deviation signal generation portion for generating a pulse deviation signal with its phase as shifted with respect to that of the pulse signal by certain time. Further, the EOR circuit 1264 and the current source 1266 correspond, in combination, also to a discharge portion for discharging the charge accumulation portion only during a certain lapse of time when there is a potential difference between the pulse signal and the pulse deviation signal. The comparator 1268 corresponds to a signal output portion for outputting a signal in accordance with whether a voltage output from the charge accumulation portion satisfies a criterion.

The ENV circuit 1260 is provided to detect that a Fiber signal (1) is input. For example, it detects that the Fiber signal (1) has become an Fc signal amplitude detection threshold voltage (see FIGS. 9 and 10) or higher, to raise an output voltage of an Fc signal ENV (3), which is an output signal of the ENV circuit 1260.

The comparator 1261 outputs an FCENV-P detection signal (4) if the voltage of the Fc signal ENV (3) has become an FC amplitude reference voltage (2) or higher.

It is thus possible to detect that the Fiber signal (1) is input. Further, the FCENV-P detection signal (4) is thus output to thereby flow a constant current through the current source 1265. Power required to flow the constant current through the current source 1265 is supplied from the charge pump voltage generation circuit 1267. The constant current is thus flown through the current source 1265 to thereby increase the quantity of charge accumulated in the capacitor 1279. Further, this causes a voltage of a Charge Pump output (9) to be raised.

The AND circuit 1262 outputs an Fc signal A (5). The Fc signal A (5) refers to the Fiber signal (1) output from the AND circuit 1262 only in a period when the FCENV-P detection signal (4) is output.

The Fc signal A (5), which is output from the AND circuit 1262, is input to the EOR circuit 1264 together with DLFc signal A (6) which is generated as shifted in phase by the delay circuit 1263 by certain time. Then, the EOR circuit 1264 outputs the pulse signal (EOR output signal (7)) having a certain time width at each leading or trailing edge of the Fc signal A (5) (each time the signal level of the pulse signal is switched).

The EOR output signal (7) output from the EOR circuit 1264 causes a constant current to flow through the current source 1266. In a period when the constant current flows through the current source 1266, the capacitor 1279 is released of charge accumulated therein. That is, a quantity of the charge accumulated in the capacitor 1279 is prevented from increasing. As a result, a voltage of the Charge Pump output (9) is lowered.

The comparator 1268 outputs the ENVETCT-P signal (10) depending on whether the voltage of the Charge Pump output (9) is not less than the threshold voltage or not. It outputs the ENVETCT-P signal (10) if the voltage of the Charge Pump output (9) is not less than the threshold voltage, that is, if it satisfies the criterion.

Thanks to the signal/frequency monitor circuit 1257 described above, the capacitor 1279 is electrically charged by the constant current source 1265 at a constant rate and discharged each time the signal level of the Fiber signal (1) is switched. Accordingly, for example, if a frequency of the Fiber signal (1) increases, the quantity of charge released in unit time increases. Therefore, a lapse of time from a moment when the capacitor 1279 starts to be charge to a moment when the voltage of the Charge Pump output (9) becomes the threshold voltage or higher becomes longer. If, for example, the frequency of the Fiber signal (1) decreases, on the other hand, the quantity of charge released in the unit time decreases. Therefore, the lapse of time from the moment when the capacitor 1279 starts to be charge to the moment when the voltage of the Charge Pump output (9) becomes the threshold voltage or higher becomes shorter.

It is thus possible to identify the frequency of the Fiber signal (1) based on the lapse of time from the moment when the capacitor 1279 starts to be charged to the moment when the voltage of the Charge Pump output (9) becomes the threshold voltage or higher. For this purpose, the CDR transfer setting circuit 1258 shown in FIG. 8 is provided.

The CDR transfer setting circuit 1258 comprises an AND circuit 1270, a counter circuit 1271, EOR circuits 1272, and flip-flops 1273.

Of these, the AND circuit 1270 and the counter circuit 1271 corresponds, in combination, to a time measurement portion for measuring a lapse of time that has elapsed since the quantity of charge accumulated in the charge accumulation portion started to vary. Further, the EOR circuit 1272 and the flip-flop 1273 correspond, in combination, to the frequency identification portion for identifying the frequency based on a lapse of time from a moment when the quantity of the charge started to vary to a moment when a signal that indicates that a voltage of the charge accumulation portion satisfies the criterion was output.

The AND circuit 1270 outputs a GET Clock-N signal (11) only in a period when the FCENV-P detection signal (4) is output. The FCENV-P detection signal (4) is output by the comparator 1261 shown in FIG. 7. The GET Clock-N signal (11) is a clock signal generated by, for example, a crystal oscillation circuit.

The counter 1271 counts pulses of the GET Clock-N signal (11) output from the AND circuit 1270. If the number of pulses of the GET Clock-N signal (11) becomes four or more, a signal is output from an output terminal indicated as "4". Similarly, if the number of pulses of the GET Clock-N signal (11) becomes eight or more, 10 or more, or 14 or more, a signal is output from an output terminal indicated as "8", "A", or "E" respectively.

The EOR circuit 1272 calculates by operations an exclusive logical sum of the signals output from the counter circuit 1271 and outputs a result of the operations. According to the present embodiment, the two EOR circuits 1272 are used so that they may output the signal when the number of pulses of the GET Clock-N signal (11) is four to eight and when it is 10(A) to 14(E) respectively. In this case, the signal output when it is four to eight is used to decide whether the frequency of the Fiber signal is 1 Gbps. Further, the signal output when it is 10(A) through 14(E) is used to decide whether the frequency of the Fiber signal is 2 Gbps.

The output signals output from the two EOR circuits 1272 are input to the respective flip-flops 1273. First, they are synchronized with the GET Clock-N signal (11) and then with the ENVETCT-P signal (10). The ENVETCT-P signal (10) is an output signal of the comparator 1268 described above with reference to FIG. 7.

By the CDR transfer setting circuit 1258, if the ENVETCT-P signal (10) is output from the comparator 1268 when the number of pulses of the GET Clock-N signal (11) is, for example, four to eight, a 1 Gb/s DET signal (15-A) is output. If the ENVETCT-P signal (10) is output from the comparator 1268 when the number of pulses of the GET Clock-N signal (11) is 10(A) through 14(E), a 2 Gb/s DET signal (15-B) is output. That is, when the 1 Gb/s DET signal (15-A) is output, the frequency of the Fiber signal (1) can be identified to be 1 Gbps, while when the 2 Gb/s DET signal (15-B) is output, the frequency of the Fiber signal (1) can be identified to be 2 Gbps. Of course, the CDR transfer setting circuit 1258 can be arranged so that it can identify any other frequencies.

For example, if the frequency of the Fiber signal (1) is identified to be 1 Gbps by the signal frequency monitor circuit 1257 and the CDR transfer setting circuit 1258 in a case where the reference voltage input to the voltage-controlled oscillation circuit 1254 is set so as to match a frequency of, for example, 2 Gbps, the 1 Gb/s DET signal (15-A) is input to the frequency division circuit 1259 to thereby divide the frequency of the clock signal by two. In such a manner, the frequency of the Fiber signal (1) and that of the clock signal can be adjusted to agree. Of course, as shown in FIG. 6, the multiplexer 1277 can also be used to select either the case of passing the clock signal through the frequency division circuit 1259 or the case of not doing so, thereby adjusting the frequency of the Fiber signal (1) and that of the clock signal so that they may agree. It is to be noted that a frequency division ratio of the frequency division circuit 1259 is not limited to two and may be three, four, or any other value. Further, it may have a plurality of frequency division ratios. Further, a frequency multiplication circuit may be provided to multiply the frequency of the clock-signal.

It is to be noted that although there has been described an example of the method by which the signal/frequency monitor circuit 1257 and the CDR transfer setting circuit 1258 respectively shown in FIGS. 7 and 8 use the current sources 1265 and 1266 to thereby increase and decrease the quantity of charge accumulated in the capacitor 1279 in order to identify the frequency of the Fiber signal (1), any other method can be employed to identify the frequency of the Fiber signal (1). For example, such a method can be employed that, for example, a typical counter circuit is used to start count-up at every constant lapse of time at the same time as the Fiber signal (1) starts to be input while performing count-down each time the leading or trailing edge of the Fiber signal (1) is detected so that the frequency of the Fiber signal (1) may be identified on the basis of a lapse of time that has elapsed until an output value of the counter circuit reached a certain value. Alternatively, the frequency of the Fiber signal (1) can be identified also by, for example, measuring the number of pulses sent from a crystal oscillator in a period from a moment when one leading edge of the Fiber signal (1) is detected to a moment when its next leading edge is detected.

It is to be noted that although there has been described an example where the signal/frequency monitor circuit 1257 and the CDR transfer setting circuit 1258 respectively shown in FIGS. 7 and 8 start charging the capacitor 1279 at the same time as the Fiber signal (1) starts to be input, the capacitor 1279 may start to be discharged at the same time as the Fiber signal (1) starts to be input. In this case, the capacitor 1279 is charged only during a constant lapse of time each time the leading or trailing edge of the Fiber signal (1) is detected. With this, the frequency of the Fiber signal (1) is identified on the basis of a lapse of time that has elapsed until the voltage of the Charge Pump output (9) went down to a value not higher than the threshold voltage.

As described above, according to the CDR circuit 1250 related to the present embodiment, it is possible to identify the frequency of the pulse signal transferred through the communication path 1211 to thereby divide the frequency of the clock signal so as to match the frequency of the pulse signal, thus eliminating a necessity of individually setting the reference voltage input to the voltage-controlled oscillation circuit 1254 in such a manner as to match the frequency of the pulse signal. This enables mitigating burdens of maintaining and managing the storage unit 1000. Further, it is possible to mount the storage unit 1000 with the disk drives 1210 having different frequencies as mixed therein. It is thus possible for a user who owns, for example, the disk drive 1210 having a low frequency and the disk drive 1210 having a high frequency to eliminate a necessity of providing the storage unit 1000 for each of the different frequencies of the disk drives 1210.

Further, the CDR circuit 1250 related to the present embodiment can be applied not only to the storage unit 1000 but also to a variety of digital communication apparatuses. For example, it can be applied to a communication signal shaping circuit used in a communication apparatus. Further, semiconductor devices such as PLL (Phase Locked Loop), SerDes (Serializer/Deserializer), CDR (Clock Data Recovery) including wave shaping function for plurality of communication signals can be applied to digital signal measurement apparatus for carrying out wave form measurement such as EYE pattern, jitter, or interval analyzer etc.

Figure 11:
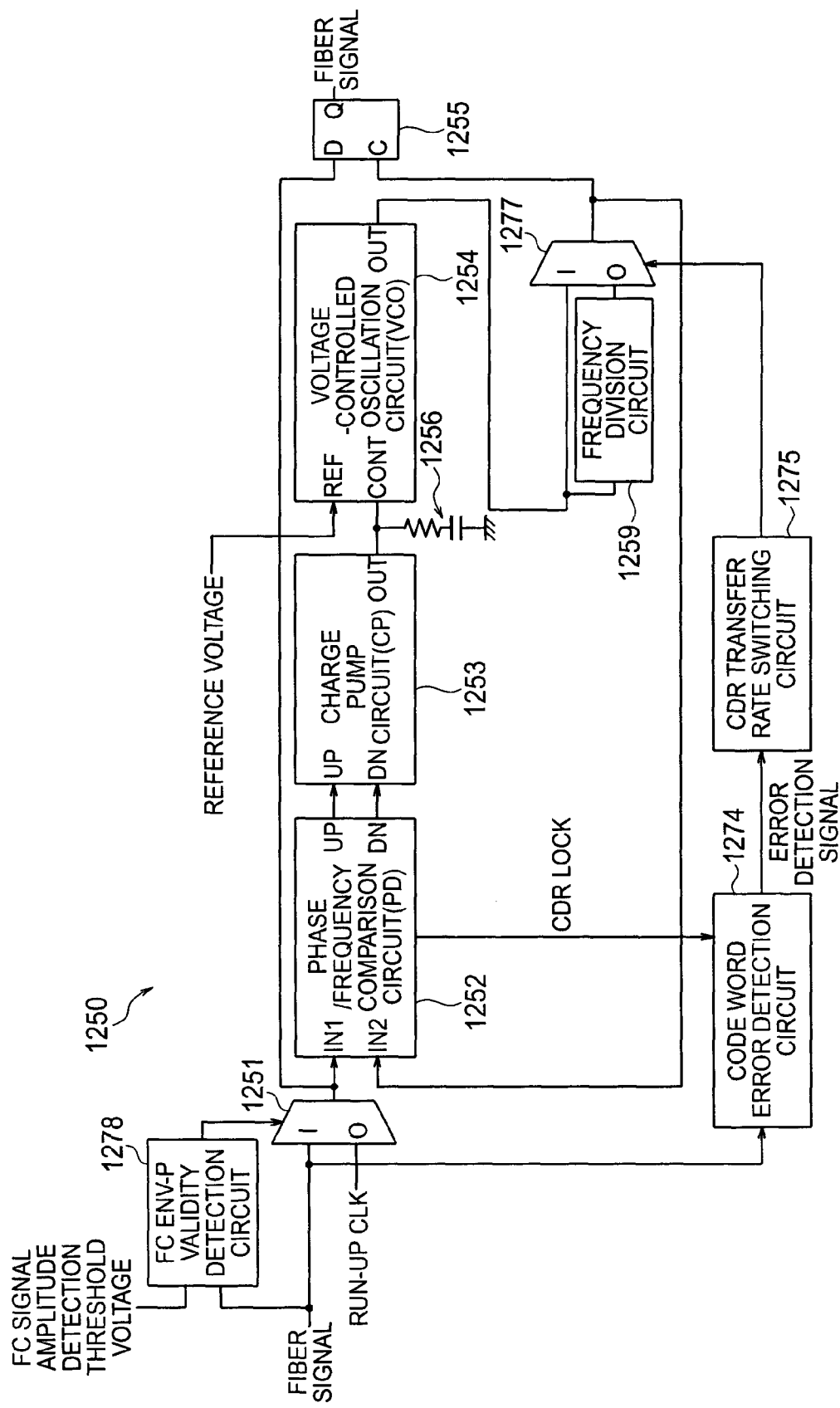
FIG. 11 is a block diagram for showing a CDR circuit related to a second embodiment.

Now, a block diagram of a CDR circuit 1250 related to a second embodiment is shown in FIG. 11.

As shown in FIG. 11, the CDR circuit 1250 related to the present embodiment comprises an FC ENV-P validity detection circuit 1278, a multiplexer 1251, a phase/frequency comparison circuit 1252, a charge pump circuit 1253, a voltage-controlled oscillation circuit 1254, a flip-flop (synchronization portion for synchronizing a pulse signal with a frequency-divided clock signal) 1255, and a filter circuit 1256 and, in addition, a Code Word Error detection circuit (communication specifications decision portion for deciding whether the pulse signal satisfies communication specifications) 1274 when the pulse signal is read in a period of the clock signal, a CDR transfer rate switching circuit (communication specifications decision portion for deciding whether the pulse signal satisfies the communication specifications) 1275 when the pulse signal is read in a period of the clock signal, a frequency division circuit (frequency division portion for dividing a frequency of the clock signal at a frequency division ratio that corresponds to a frequency of the pulse signal) 1259, and a multiplexer 1277.

See the description of the first embodiment for the FC ENV-P validity detection circuit 1278, the multiplexer 1251, the phase/frequency comparison circuit 1252, the charge pump circuit 1253, the voltage-controlled oscillation circuit 1254, the flip-flop 1255, the filter circuit 1256, the frequency division circuit 1259, and the multiplexer 1277.

The Code Word Error detection circuit 1274 and the CDR transfer rate switching circuit 1275 decide, in combination, whether an error is detected in the pulse signal when it is read in a period of the clock signal.

The errors detected at the Code Word Error detection circuit 1274 include those defined by the fiber channel standards such as a 10B/8B conversion error (Code Word Character error), a Loss of Sync error, and a Run Length Violation Detection error. How the 10B/8B conversion error, the Run Length Violation Detection error, and the Loss of Sync error are detected at a data input/output circuit of a disk drive 1210 that conforms to the fiber channel standards is shown in FIGS. 13 and 14.

As shown in FIG. 14, each piece of receive data comprises a Start Of Frame (SOF) bit, a Header, a Payload, a Cyclic Redundancy Check (CRC), and an End Of Frame (EOF) in configuration.

Figure 13:
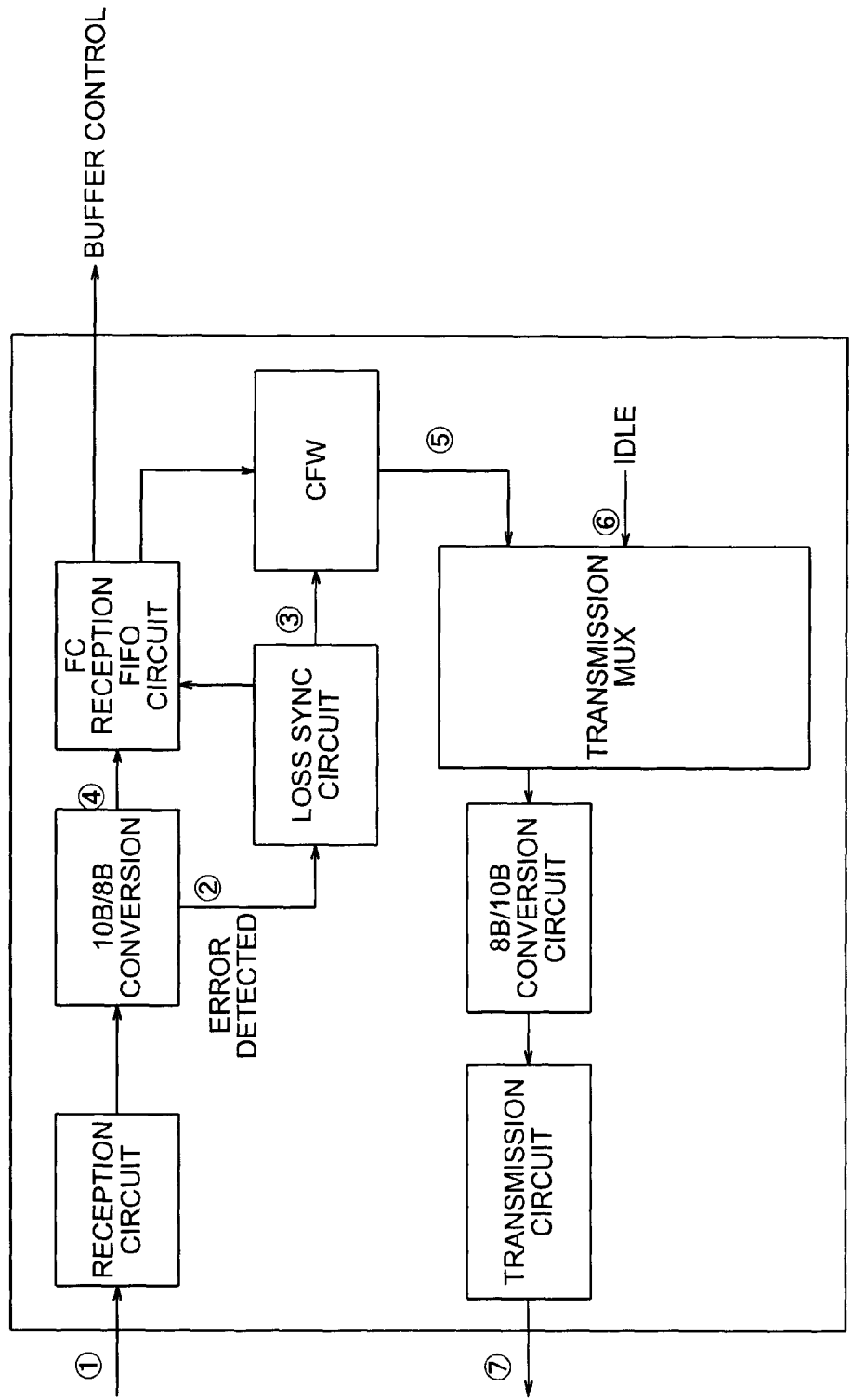
FIG. 13 is a block diagram for showing how an error is detected according to the present embodiment.

When receive data is received by a reception circuit shown in FIG. 13, it is checked at a 10B/8B conversion circuit on whether it has a Code Word error or a Run Length Violation Detection error. If none of the error is detected, the receive data is transferred via an FC reception First In First Out (FIFO) circuit to a buffer in the disk drive 1210.

If any of the errors is detected at the 10B/8B conversion circuit, on the other hand, the error is posted to a Loss Sync circuit. The Loss Sync circuit, if it detects that the number of errors detected during reception of the Payload of the receive data has become four or more, transmits to the FC reception FIFO and a Current Fill Word (CFW) a signal which notifies them of occurrence of the Loss of Sync error. When having received from the Loss Synch circuit the signal that notifies it of the occurrence of the Loss of Sync error, the CFW replaces the Payload data with an IDLE or ARBx signal (which stands for the ARBitrate signal, in which "x" indicates an Arbitrated Loop Physical Address (AL-PA)) and transmits it to a transmission MUX circuit. Then, data obtained by thus replacing part of the Payload with the IDLE or ARBx is transmitted via an 8B/10B conversion circuit from a transmission circuit. When the data is received by the next disk drive 1210 in an FC-AL loop, an LED of an LED indication portion 1240 is lit, to post the error occurrence to an operator etc.

Referring back to FIG. 11, it can be seen that an error in the Fiber signal is thus detected at the Code Word Error detection circuit 1274. For example, a reference voltage is set beforehand in such a manner that the clock signal having a frequency of 4 Gbps may be output from the voltage-controlled oscillation circuit 1254, so that when the Fiber signal is read at this frequency, the Code Word Error detection circuit 1274 decides whether the 10B/8B conversion error (Code Word Character error), the Loss of Sync error, or the Run Length Violation Detection error is detected. Note here that the error is detected when a CDR LOCK signal is received from the phase/frequency comparison circuit 1252. The CDR LOCK signal is output when a leading or trailing edge of the pulse signal input from an IN1 terminal and that of the clock signal input from an IN2 terminal agree in phase with each other.

If at least any one of the 10B/8B conversion error (Code Word Character error), the Loss of Sync error, and the Run Length Violation Detection error is detected at the Code Word Error detection circuit 1274, a signal that notifies of the detection of the error is transmitted to the CDR transfer rate switching circuit 1275. When having received this signal from the Code Word Error detection circuit 1274, the CDR transfer rate switching circuit 1275 switches a frequency division ratio of the frequency division circuit (frequency division portion for dividing the frequency of the clock signal in accordance with a decision result) 1259, thus dividing the frequency of the clock signal. For example, the frequency of the clock signal is divided by two. In this case, if the clock signal has an original frequency of 4 Gbps, the frequency is divided by two to provide a frequency of 2 Gbps. The frequency division ratio is switched by, as shown in FIG. 11, using the multiplexer 1277 to select either the case of passing the clock signal output from the voltage-controlled oscillation circuit 1254 through the frequency division circuit 1259 or the case of not doing so. It is to be noted that the frequency division ratio of the frequency division circuit 1259 is not limited to two and may be three, four, or any other numeral. Further, it may have a plurality of frequency division ratios. Further, a frequency multiplication circuit may be provided to multiply the frequency of the clock signal.

The clock signal having the frequency thus divided is input again to the phase/frequency comparison circuit 1252 and the Code Word Error detection circuit 1274. Then, when the Fiber signal is read in a period of the clock signal, whether the communication specifications are satisfied is decided. If an error is detected again, the frequency division ratio is switched further. For example, the frequency is divided by four. In such a manner, the frequency of the clock signal can be set to 1 Gbps.

Figure 12:
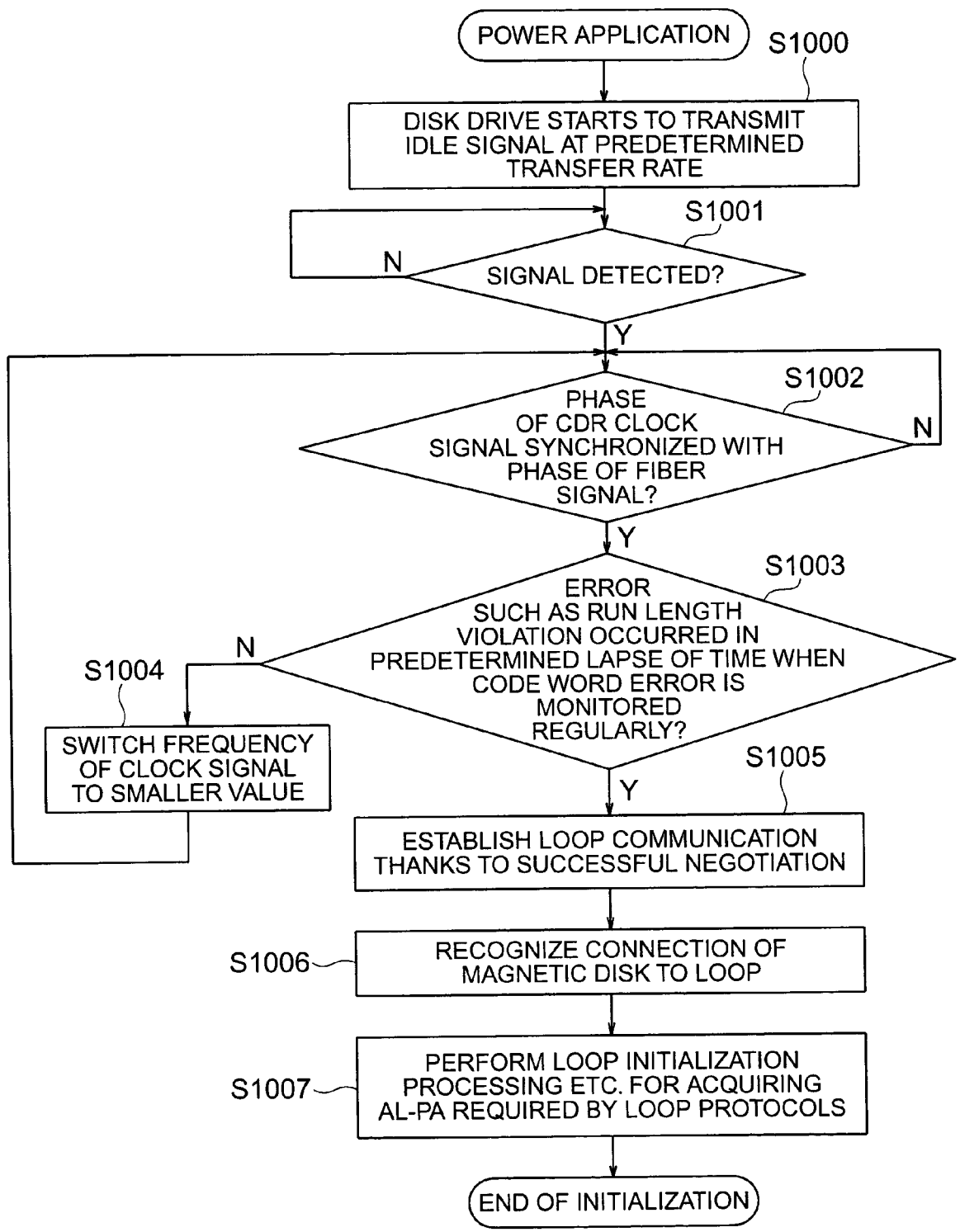
FIG. 12 is a flow chart for showing a flow of processing in the CDR circuit related to the present embodiment.

A flow chart showing a flow of processing in the CDR circuit 1250 related to the second embodiment is shown in FIG. 12.

First, when it is started to supply power to the disk drive 1210 to be connected to a transfer path 1211 that constitutes the FC-AL loop, the disk drive 1210 in the FC-AL loop starts transmitting an IDle signal (pulse signal) (S1000). The IDle signal is defined by the fiber channel standards. If the disk drive 1210 is connected more than one in the FC-AL loop, such a predetermined disk drive 1210 of them as to be defined by the fiber channel standards starts transmitting the IDle signal. When the CDR circuit 1250 detects that the IDle signal is input (S1001), it synchronizes the IDle signal and the clock signal with each other (S1002). If they are synchronized with each other in phase, the process checks for the 10B/8B conversion error (Code Word Character error), the Loss of Sync error, and the Run Length Violation Detection error (S1003). If any one of these errors is detected, the process selects "N". Then, the process switches the frequency division ratio of the frequency division circuit 1259 as described above to divide the frequency of the clock signal (S1004). If no error is detected at S1003, the process selects "Y". In such a manner, negotiation between the IDle signal and the clock signal becomes successful to establish communication of the FC-AL loop (S1005). Then, a disk adapter 1124 recognizes that the disk drive 1210 has been connected to the FC-AL loop (S1006) and performs initialization processing etc. on the FC-AL (S1007) in order to acquire an AL-PA.

In such a manner, the CDR circuit 1250 related to the present embodiment can identify a speed of communication performed through the FC-AL loop to thus divide the frequency of the clock signal in such a manner as to match the communication speed. Accordingly, it is possible to eliminate a necessity of individually setting a reference voltage input to the voltage-controlled oscillation circuit 1254 in such a manner as to match the frequency of the pulse signal. This enables mitigating burdens of maintaining and managing the storage unit 1000. Further, it is possible to mount the storage unit 1000 with the disk drives 1210 having different frequencies as mixed therein. It is thus possible for a user who owns, for example, the disk drive 1210 having a low frequency and the disk drive 1210 having a high frequency to eliminate a necessity of providing the storage unit 1000 for each of the different frequencies of the disk drives 1210.

Further, the CDR circuit 1250 related to the present embodiment can be applied not only to the storage unit 1000 but also to a variety of digital communication apparatuses. For example, it can be applied to a communication signal shaping circuit used in a communication apparatus. Further, it can be applied also to a signal input circuit in a digital signal measurement apparatus etc. that is provided with a PBC having a function to be automatically synchronized with a plurality of signals, a SerDes, a PLL, a CDR, a semiconductor, etc. when the circuit is used in measurement etc. of an EYE pattern or a jitter or in measurement by use of an interval analyzer etc.

Although the present embodiment has been described with reference to a storage unit that can identify the frequency of the pulse signal having communication speeds of, for example, 1 Gbps and 2 Gbps, the present invention is not limited thereto; in fact, preferably the storage unit can identify the frequency of the pulse signal having a communication speed of any other values and accommodate the frequency thus identified.

The above embodiments have been described just to facilitate understanding of the present invention and are not to be construed as limitations on the present invention. Changes and improvements may be made without departing from the gist of the present invention and their equivalents also fall in the scope of the present invention.

What is claimed is:
1. A storage unit comprising:
a channel control portion for receiving a data input/output request;
a cache memory for storing data;
a disk control portion for performing input/output processing on data in accordance with said data input/output request;
a plurality of disk drives for storing data,
wherein at least two of said disk drives input data to and output data from said disk control portion at different communication speeds relative to the communication speeds of the others of said disk drives,
a generation portion for generating a clock signal by using a pulse signal transferred for communication between said disk control portion and said disk drives;
an identification portion for identifying a frequency of said pulse signal;
a frequency division portion for dividing a frequency of said clock signal at a frequency division ratio that corresponds to a frequency of said pulse signal; and
a synchronization portion for synchronizing said pulse signal with a clock signal having said divided frequency,
wherein said identification portion comprises:
a charge accumulation portion for outputting a voltage that corresponds to a quantity of charge accumulated therein,
a charge quantity variation portion for varying said quantity of said charge accumulated in said charge accumulation portion, at a certain variation rate,
a charge quantity variation suppression portion for inhibiting said variation only during a certain lapse of time each time a signal level of said pulse signal is switched,
a signal output portion for outputting a signal that corresponds to whether said voltage output from said charge accumulation portion satisfies a criterion,
a time measurement portion for measuring a lapse of time that has elapsed since said quantity of said charge accumulated in said charge accumulation portion started to vary, and
a frequency identification portion for identifying said frequency based on said lapse of time from a moment when said quantity of said charge started to vary to a moment when said signal that indicates that said voltage of said charge accumulation portion satisfies said criterion was output.

2. The storage unit according to claim 1, wherein said storage unit has a plurality of communication paths for connecting at least one of said disk drives in such a manner as to constitute a loop defined by the Fibre Channel (FC) Standards; and
each of said communication speeds is different for each of said communication paths.

3. The storage unit according to claim 1, wherein said communication is performed through a communication path which is provided to connect said disk control portion and at least one of said disk drives in such a manner as to constitute a loop defined by the FC Arbitrated Loop (AL) Standards.

4. The storage unit according to claim 1, wherein said communication is performed through a communication path provided to connect said disk control portion and at least one of said disk drives in such a manner as to constitute a loop defined by the FC-AL Standards.

5. The storage unit according to claim 1, wherein said charge quantity variation portion comprises a charging portion for charging said charge accumulation portion; and said charge quantity variation suppression portion comprises:
a pulse deviation signal generation portion for generating a pulse deviation signal having its phase as shifted with respect to that of said pulse signal by certain time; and
a discharging portion for discharging said charge accumulation portion only in a period when there is a potential difference between said pulse signal and said pulse deviation signal.

6. The storage unit according to claim 1, further comprising:
a communication specifications decision portion for deciding whether said pulse signal satisfies predetermined communication specifications, when said pulse signal is read in a period of said clock signal.

7. The storage unit according to claim 6, wherein said communication is performed through a communication path which is provided to connect said disk control portion and at least one of said disk drives in such a manner as to constitute a loop defined by the FC-AL Standards.

8. A circuit for shaping a communication signal in a storage unit according to claim 1, comprising:
a generation portion for generating a clock signal by using a pulse signal transferred communication between said disk control portion and said disk drives;
an identification portion for identifying a frequency of said pulse signal;
a frequency division circuit for dividing a frequency of said clock signal at a frequency division ratio that corresponds to a frequency of said pulse signal; and
a synchronization portion for synchronizing said pulse signal with said clock signal having said divided frequency.

9. The circuit according to claim 8, wherein said identification portion comprises:
a charge accumulation portion for outputting a voltage that corresponds to a quantity of charge accumulated therein;
a charge quantity variation portion for varying said quantity of said charge accumulated in said charge accumulation portion, at a certain variation rate;
a charge quantity variation suppression portion for inhibiting said variation only during a certain lapse of time each time a signal level of said pulse signal is switched;
a signal output portion for outputting a signal that corresponds to whether said voltage output from said charge accumulation portion satisfies a criterion;
a time measurement portion for measuring a lapse of time that has elapsed since said quantity of said charge accumulated in said charge accumulation portion started to vary; and
a frequency identification portion for identifying said frequency based on said lapse of time from a moment when said quantity of said charge started to vary to a moment when said signal that indicates that said voltage of said charge accumulation portion satisfies said criterion was output.

10. The circuit according to claim 9, wherein; said charge quantity variation portion comprises a charging portion for charging said charge accumulation portion; and
said charge quantity variation suppression portion comprises:
a pulse deviation signal generation portion for generating a pulse deviation signal having its phase as shifted with respect to that of said pulse signal by certain time; and
a discharging portion for discharging said charge accumulation portion only in a period when there is a potential difference between said pulse signal and said pulse deviation signal.

11. A circuit for shaping a communication signal in a storage unit according to claim 1, comprising:
a generation portion for generating a clock signal by using a pulse signal transferred communication between said disk control portion and said disk drives;
a communication specifications decision portion for deciding whether said pulse signal satisfies specifications of said communication, when said pulse signal is read in a period of said clock signal;
a frequency division portion for dividing a frequency of said clocks signal in accordance with a result of said decision; and
a synchronization portion for synchronizing said pulse signal with said clock signal having said divided frequency.

* * * * *